United States Patent [19]
Perque

[11] Patent Number: 5,809,663
[45] Date of Patent: Sep. 22, 1998

[54] PORTABLE, SOLAR POWERED CLOTHES DRYER

[76] Inventor: Allen J. Perque, 19474 W. Rose St., Vacherie, La. 70090

[21] Appl. No.: 842,866

[22] Filed: Jul. 17, 1997

[51] Int. Cl.$^6$ ................................. F25B 11/04; F25B 3/28
[52] U.S. Cl. ................................. 34/93; 34/512; 34/522
[58] Field of Search ................................. 34/93, 512, 522

[56] References Cited

U.S. PATENT DOCUMENTS

| | | | |
|---|---|---|---|
| 4,236,322 | 12/1980 | Hastings | 34/130 |
| 4,245,398 | 1/1981 | Poisson | 34/93 |
| 4,429,472 | 2/1984 | Dodelin et al. | 34/48 |
| 4,514,914 | 5/1985 | Kitzmiller | 34/93 |
| 4,702,018 | 10/1987 | Hastings | 34/130 |
| 5,001,546 | 3/1991 | Andrassy | 34/93 |

FOREIGN PATENT DOCUMENTS

| | | | |
|---|---|---|---|
| 61-21439 | 5/1986 | Japan | 34/93 |
| 2-275283 | 11/1990 | Japan | 34/93 |
| 5-329297 | 12/1993 | Japan | 34/93 |

*Primary Examiner*—Christopher Kilner
*Attorney, Agent, or Firm*—Joseph N. Breaux

[57] ABSTRACT

A portable, solar powered clothes dryer comprising a dark-colored portable hamper which is perforated; a hamper shaft journaled in the center of the dark-colored portable hamper which serves the dual functionality of (1) handles for facilitating the portability of the dark-colored portable hamper, and (2) a spinning axis for spinning the dark-colored portable hamper; and, a solar power motor system for spinning the dark-colored portable hamper about said spinning axis. The drying process of the solar powered clothes dryer utilizes, in combination, maximized attraction of the heat energy from the sun by a dark-colored portable hamper for collecting heat energy therein, wherein the drying process does not utilize artificially produced heat, and the air draft from the spinning motion of the solar powered motor system.

10 Claims, 3 Drawing Sheets

PORTABLE, SOLAR POWERED CLOTHES DRYER

TECHNICAL FIELD

The present invention relates to solar powered clothes dryers and more particularly to a portable, solar powered clothes dryer comprising a dark-colored portable hamper which is perforated; a hamper shaft journaled through the center of the dark-colored portable hamper which serves the dual functionality of (1) handles for facilitating the portability of the dark-colored portable hamper, and (2) a spinning axis for spinning the dark-colored portable hamper; and, a solar powered motor system for spinning the dark-colored portable hamper about said spinning axis. The drying process of the solar powered clothes dryer utilizes, in combination, maximized attraction of the heat energy from the sun by the dark color of the dark-colored portable hamper for collecting heat energy therein (wherein the drying process does not utilize artificially produced heat) and the air draft from the spinning motion of the solar powered motor system.

BACKGROUND OF THE INVENTION

As known, electric or gas powered clothes dryers are expensive to use. Henceforth, several attempts have been made to use solar energy to power clothes dryers for drying clothes in an inexpensive manner. Some known solar energy powered clothes dryers include U.S. Pat. No. 4,236,322, by Hastings, U.S. Pat. No. 4,429,472, by Dodelin et al., and U.S. Pat. No. 4,514,914, by Kitzmiller. While each of the above dryers may operate as desired, none of them utilize, in combination, maximized attraction of the heat energy, from the sun, by the dark color of the dark-colored portable hamper for collecting heat energy therein (wherein the drying process does not utilize artificially produced heat) and the air draft from the spinning motion of the solar powered motor system. Moreover, the known dryers do not have a hamper shaft journaled through the center of a dark-colored portable hamper which serves the dual functionality of (1) handles for facilitating the portability of the dark-colored portable hamper, and (2) a spinning axis for spinning the dark-colored portable hamper.

SUMMARY OF THE INVENTION

The preferred embodiment of the portable, solar powered clothes dryer of the present invention solves the aforementioned problems in a straight forward and simple manner. What is provided is a portable, solar powered clothes dryer comprising a dark-colored portable hamper which is perforated; a hamper shaft journaled through the center of the dark-colored portable hamper which serves the dual functionality of (1) handles for facilitating the portability of the dark-colored portable hamper, and (2) a spinning axis for spinning the dark-colored portable hamper; and, a solar powered motor system for spinning the dark-colored portable hamper about said spinning axis. The drying process of the solar powered clothes dryer utilizes, in combination, maximized attraction of the heat energy from the sun by the dark color of the dark-colored portable hamper for collecting heat energy therein (wherein the drying process does not utilize artificially produced heat) and the air draft from the spinning motion of the solar powered motor system.

The portable, solar powered clothes dryer comprises a portable support frame, a dark-colored portable hamper, removably coupled to said portable support frame, having a plurality of perforations formed in a surface area thereof, a hamper shaft journaled through a center of said dark colored portable hamper via first and second apertures formed in two opposite sides of said dark-colored portable hamper, and a solar powered motor system coupled to one distal end of said hamper shaft for spinning said hamper shaft wherein as said hamper shaft spins said dark-colored portable hamper spins.

In view of the above, an object of the invention is to provide a portable, solar powered clothes dryer having a dark-colored portable hamper wherein the dark color maximizes the attraction of the heat energy from the sun for collecting and absorbing such heat energy. The collected and absorbed heat energy is transferred to the interior of such dark-colored portable hamper for drying the clothes.

Another object of the invention is to provide a dark-colored portable hamper having a plurality of perforations wherein the plurality of perforations serves to allow air and heat energy to enter therethrough and to allow moisture and/or evaporation of such moisture to exit therethrough during the drying process.

A further object of the invention is to provide a dark-colored portable hamper which can be easily removed from a portable support frame and carried inside the home or laundry room via the hamper shaft wherein the dried clothes may then be folded inside. Moreover, wet clothes may be placed in the dark-colored portable hamper and carried via the hamper shaft to the portable support frame.

A further object of the invention is to provide a solar powered motor system which stores solar power via a rechargeable battery for powering the motor system during intervals of obstructed sun light.

It is a still further object of the invention to provide a portable support frame having a plurality of wheels for maneuvering a solar panel coupled to such portable support frame in the direct path of the sun's rays. Moreover, the plurality of wheels allows the portable support frame and/or dark-colored portable hamper to be easily rolled out of adverse weather conditions and under shelter.

It is a still further object of the invention to provide a portable support frame which provides a channel for housing wiring which connects the solar panel to the motor system.

In view of the above objects, a feature of the invention is to provide a portable, solar powered clothes dryer which is simple to use and inexpensive to operate.

The above objects and other features of the present invention will become apparent from the drawings, the description given herein, and the appended claims.

BRIEF DESCRIPTION OF THE DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 1:
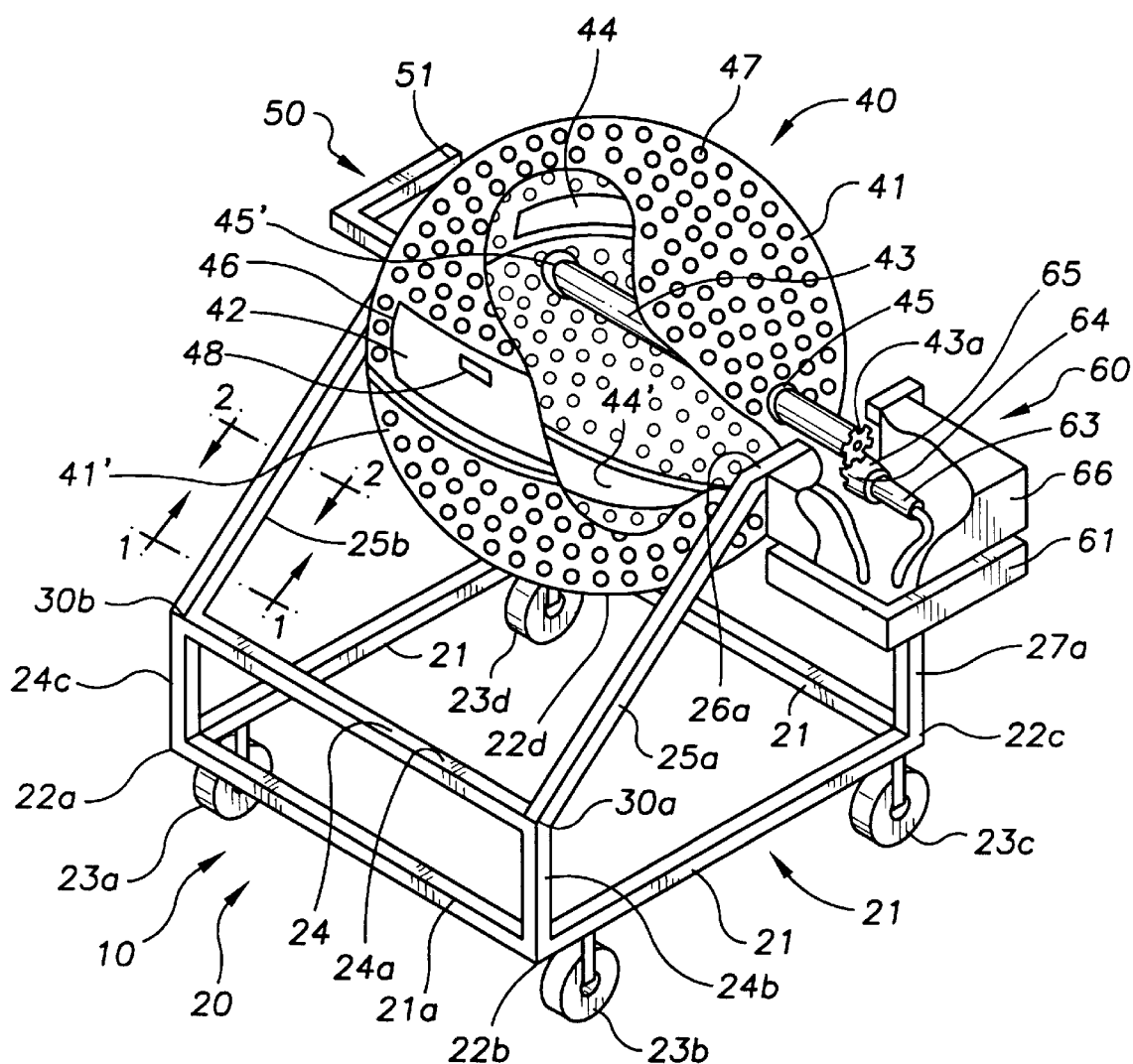
FIG. 1 illustrates a perspective view of the portable solar powered clothes dryer of the preferred embodiment of the present invention.

Referring now to the drawings, and in particular FIG. 1, the portable, solar powered clothes dryer of the present invention is designated generally by the numeral 10. Portable, solar powered clothes dryer 10 is comprised of portable support frame 20, dark-colored portable hamper 40, solar power source 50, and motor system 60.

Dark-colored portable hamper 40 comprises first hollow semi-spherical housing member 41, second hollow semi-spherical housing member 41', access door 42, hamper shaft 43 and at least one tumbler rib 44. First hollow semi-spherical housing member 41 and second hollow semi-spherical housing member 41' are fixedly coupled together to form a spherical housing. First hollow semi-spherical housing member 41 and second hollow semi-spherical housing member 41' comprise apertures 45 and 45', respectively, for journaling therethrough hamper shaft 43 wherein hamper shaft 43 is journaled through a center of said spherical housing and fixedly coupled thereto. One distal end of hamper shaft 43 has coupled thereto gear wheel 43a. Hamper shaft 43 serves the dual functionality of (1) handles for facilitating the portability of dark-colored portable hamper 40, and (2) a spinning axis for spinning dark-colored portable hamper 40. Henceforth, dark-colored portable hamper 40 can be easily removed from portable support frame 20 and carried inside the home or laundry room via hamper shaft 43 wherein the dried clothes may then be folded inside. Moreover, wet clothes may be placed in dark-colored portable hamper 40 and carried via hamper shaft 43 to portable support frame 20.

The spherical surface area of said spherical housing has formed therein a plurality of spaced perforations 47 covering said spherical surface area. The plurality of spaced perforations of said spherical housing serve to allow air and heat energy to enter therethrough and to allow moisture and/or evaporation of such moisture to exit therethrough during the drying process.

In the preferred embodiment said spherical housing is made of a black colored durable material wherein said black colored durable material functions to maximize the attraction of the heat energy from the sun. The attracted heat energy is collected and transferred to the interior of said spherical housing for increasing the temperature of the air therein. As a result, the amount of time to dry clothes placed in said spherical housing is decreased. While the color black is preferred, any suitable dark color may be substituted. In the preferred embodiment, the durable material is plastic or the like.

In the preferred embodiment there are two tumbler ribs 44 and 44' formed in the interior spherical surface of first hollow semi-spherical housing member 41 and second hollow semi-spherical housing member 41', respectively, for tumbling the clothes thereby facilitating the drying process.

First hollow semi-spherical housing member 41 comprises access aperture 46 for permitting access into said spherical housing for placement of clothes therein. Access aperture 46 is covered by access door 42 for enclosing said spherical housing. Access door 42, comprising handle member 48, is pivotally coupled to first hollow semi-spherical housing member 41 via a spring-biased hinge member (not shown). When access door 42 is in a closed position (as shown), access door 42 is maintained urged toward said spherical housing. When access door 42 is in an open position, access door 42 springs back to the closed position when a force of pressure is applied to close access door 42.

Alternatively, instead of a spring-biased hinge member for coupling access door 42 to said spherical housing, a side of access door 42 may be latched to said spherical housing and the other side parallel to said side may be hinged.

Portable support frame 20 comprises square frame base 21, having four support bars 21a, 21b, 21c and 21d. The bottom surfaces of the four support bars 21a, 21b, 21c and 21d, respectively, have coupled thereto, in close proximity to four corners 22a, 22b, 22c and 22d, four wheels 23a, 23b, 23c and 23d, respectively. The four wheels 23a, 23b, 23c and 23d serve to allow portable support frame 20 to maneuver solar power source 50 coupled thereto in the direct path of the sun's rays. Moreover, the four wheels 23a, 23b, 23c and 23d allow portable support frame 20 and/or dark-colored portable hamper 40 to be easily rolled out of adverse weather conditions and under shelter. In the preferred embodiment, the four wheels 23a, 23b, 23c and 23d are locking style caster wheels wherein after portable support frame 20 is rolled to the desired position, the four wheels 23a, 23b, 23c and 23d are locked to prevent movement of portable support frame 20 while dark-colored portable hamper 40 is spinning. Nevertheless, any type of suitable means capable of being locked and serve the function of rolling portable support frame 20 may be substituted for the locking style caster wheels.

Portable support frame 20 further comprises rectangularly shaped frame member 24 which is coupled perpendicularly to corners 22a and 22b of square frame base 21 wherein support bar 21a is shared by rectangularly shaped frame member 24 and square frame base 21. Rectangularly shaped frame member 24 comprises, in addition to support bar 21a, support bars 24a, 24b and 24c. Portable support frame 20 also comprises first and second angled frame members 25a and 25b unitarily coupled to corners 30a and 30b of rectangularly shaped frame member 24; first and second parallel short frame members (only first parallel short frame member 26a shown) having one distal end thereof unitarily coupled to one distal end of first and second angled frame members 25a and 25b, respectively; and, first and second parallel long frame members (only first parallel long frame member 27a shown) having one distal end thereof unitarily coupled to one distal end of said first and second short parallel frame members, respectively, and the other distal end thereof coupled to corners 22c and 22d, respectively, of square frame base 21.

In the preferred embodiment, square frame base 21, rectangularly shaped frame member 24, first and second angled frame members 25a and 25b, first parallel short frame member 26a, said second parallel short frame member (not shown), first parallel long frame member 27a and said second parallel long frame member (not shown), of portable support frame 20, are made of square steel tubing or the like.

Figure 6:
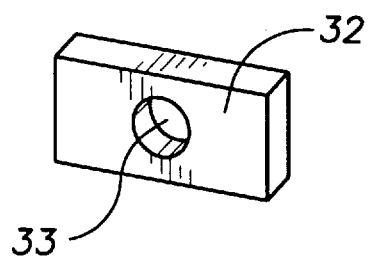
FIG. 6 illustrates a support bracket for supporting one end of the hamper shaft.

Said second parallel short frame member (not shown) has coupled thereto support bracket 32 (FIG. 6). Support bracket 32 (FIG. 6) has formed therein aperture 33 for receiving therein one distal end of hamper shaft 43 wherein hamper shaft 43 rotates therein unobstructed below solar panel box 52 of solar power source 50.

Figure 2:
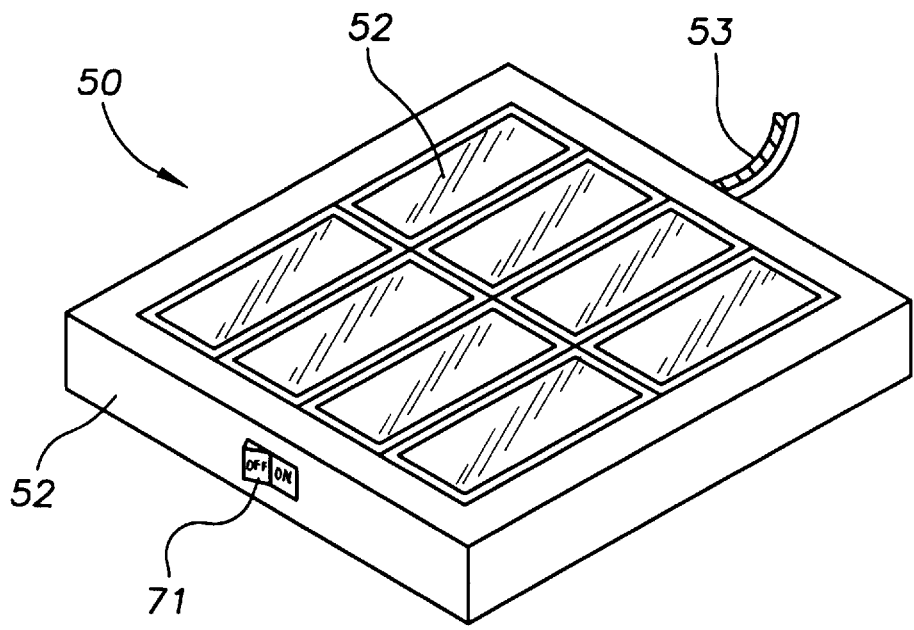
FIG. 2 illustrates a detailed view of the solar power source of FIG. 1.
Figure 3:
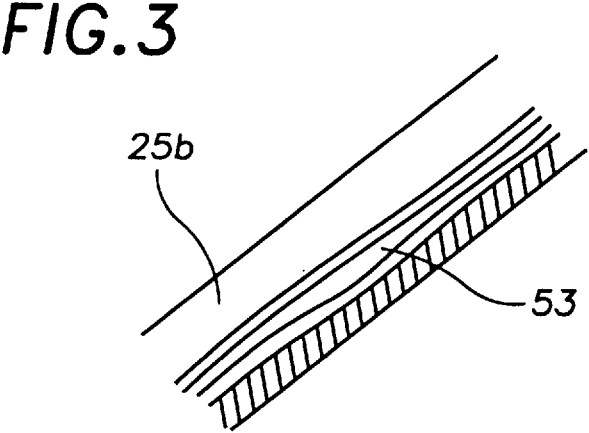
FIG. 3 illustrates a cross-sectional view of the channel along the planes of 1—1 and 2—2 of FIG. 1.

Referring also to FIG. 2, a detail view of the solar power source is illustrated. Solar power source 50 comprises a solar collecting panel having a plurality of collecting elements 51 supported by solar panel box 52. Solar panel box 52 has coupled in a side wall thereof power switch 71. Additionally, solar panel box 52 has an outlet (not shown) for passing therethrough wiring means 53 wherein wiring means 53 connects solar power source 50 to motor system 60. First and second angled frame members 25a and 25b and support bar 24c of rectangularly shaped frame member 24 provide a channel for receiving therein wiring means 53 such that wiring means 53 is not exposed to the environment and is protected. FIG. 3, illustrates a cross-sectional view of said channel along the planes of 1—1 and 2—2 of FIG. 1 wherein second angled frame member 25b is open exposing wiring means 53.

Motor system 60 comprises battery housing 61 having housed therein rechargeable battery 62 (FIG. 4) for storing solar energy from solar power source 50, motor 63 housed in motor housing 66, motor shaft 64 and gear wheel 65. Gear wheel 65 couples rotary power to gear wheel 43a coupled to hamper shaft 43 wherein as gear wheel 65 rotates gear wheel 43a rotates accordingly.

Figure 5:
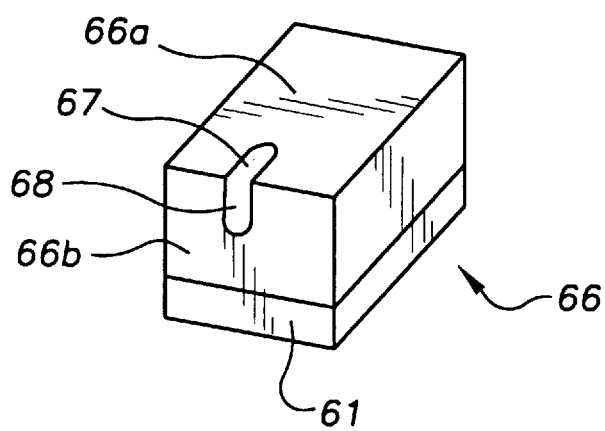
FIG. 5 illustrates a side perspective view of the motor housing.

Referring also to FIG. 5, a front perspective view of the motor housing is illustrated. Motor housing 66 has coupled thereto battery housing 61 wherein a floor of motor housing 66 passes therethrough wires for connecting rechargeable battery 62 to motor 63. Top wall 66a has formed therein elongated aperture 67 and side wall 66b has formed therein elongated aperture 68. Elongated aperture 67 and elongated aperture 68 allow gear wheel 43a and a portion of hamper shaft 43 to be inserted into motor housing 66 for coupling gear wheel 43a to gear wheel 65. When power is supplied to motor 63, the rotation of gear wheel 65 concatenates rotary power to gear wheel 43a in order to spin hamper shaft 43.

Figure 4:
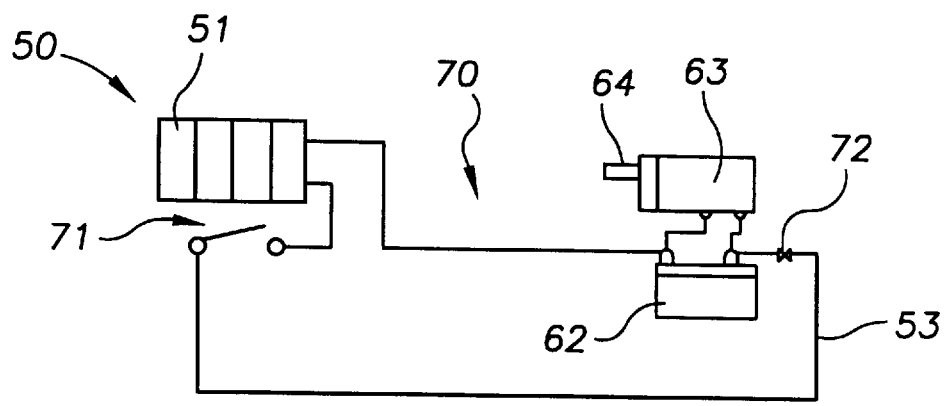
FIG. 4 illustrates a detailed view of the electrical circuit for powering the portable solar powered clothes dryer of the present invention.

Referring now to FIG. 4, the electrical circuitry for powering the motor system 60 is illustrated. Electrical circuitry 70 comprises power switch 71 which is coupled to said solar collecting panel. The output of said solar cell panel, when power switch 71 is closed is passed to rectifier 72. The output of rectifier 72 is coupled to the positive side of rechargeable battery 62, a 12-volt battery. Rechargeable battery delivers power to motor 63 having motor shaft 64 coupled thereto for spinning motor shaft 64. As motor shaft 64 spins (i.e., rotates) hamper shaft 43 spins accordingly by the concatenation of rotary power.

In operation, hamper shaft 43 journaled through darkcolored portable hamper 40 is coupled to portable support frame 20. Portable support frame 20 is rolled to a desired position which places the plurality of collecting elements 51 of said solar collecting panel in the direct path of the sun's rays. Power switch 71 is then turned on for powering motor 63. As hamper shaft 43 spins, dark-colored portable hamper 40 spins likewise wherein the spinning motion of darkcolored portable hamper 40 generates an air draft. The plurality of spaced perforations 47 formed in said spherical housing allows the air draft to enter therethrough and moisture and/or evaporation of the moisture to exit therefrom for drying the clothes placed in dark-colored portable hamper 40. Simultaneously, the dark color of dark-colored portable hamper 40 attracts heat energy from the sun wherein the attracted heat energy passes through the plurality of spaced perforations 47 and into the interior of the dark-colored portable hamper 40 for increasing the temperature of the air draft. Therefore, portable solar powered clothes dryer 10 does not utilize artificially produced heat to dry the clothes.

It can be seen from the preceding description that a portable, solar powered clothes dryer which utilizes, in combination, maximized attraction of the heat energy, from the sun, by the dark color of the dark-colored portable hamper 40 for collecting heat therein (wherein such dryer does not utilize artificially produced heat) and the air draft from the spinning motion of a solar powered motor system for drying closes has been provided.

It is noted that the embodiment of the portable, solar powered clothes dryer described herein in detail, for exemplary purposes, is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A portable, solar powered clothes dryer comprising:

a portable support frame;

a dark-colored portable hamper, removably coupled to said portable support frame, having a plurality of perforations formed in a surface area thereof;

a hamper shaft journaled through a center of said dark colored portable hamper via first and second apertures formed in two opposite sides of said dark-colored portable hamper; and, a solar powered motor system coupled to one distal end of said hamper shaft for spinning said hamper shaft wherein as said hamper shaft spins said dark-colored portable hamper spins;

said hamper shaft serving the dual functionality of (1) handles for facilitating the portability of said darkcolored portable hamper, and (2) a spinning axis for spinning said dark-colored portable hamper.

2. The portable, solar powered clothes dryer of claim 1, further comprising a solar power source coupled to one side of said portable support frame and said solar powered motor system is coupled to the other side of said portable support frame wherein said portable support frame provides a channel for receiving therein wires for transferring the power from said solar power source to said motor system wherein said wires are protected from the environment in said channel.

3. The portable, solar powered clothes dryer of claim 1, wherein said dark-colored portable hamper comprises:

a first hollow semi-spherical housing member having an access aperture formed therein;

a second hollow semi-spherical housing member coupled to said first hollow semi-spherical housing member wherein said first hollow semi-spherical housing member and said second hollow semi-spherical housing member form a spherically shaped housing;

an access door coupled to said first hollow semi-spherical housing member for enclosing said spherically shaped housing; and, at least one tumbler rib coupled to an interior surface of said spherically shaped housing.

4. A portable, solar powered clothes dryer comprising:

portable support frame;

a dark-colored portable hamper, removably coupled to said portable support frame, having a plurality of perforations formed therein;

a hamper shaft journaled through a center of said dark colored portable hamper wherein said hamper shaft serves the dual functionality of (1) handles for facilitating the portability of said dark-colored portable hamper, and (2) a spinning axis for spinning said dark-colored portable hamper; and, a solar powered motor system coupled to one distal end of said hamper shaft for spinning said hamper shaft wherein as said hamper shaft spins said dark-colored portable hamper spins.

5. The portable, solar powered clothes dryer of claim 4, wherein the color of said dark-colored portable hamper is black.

6. The portable, solar powered clothes dryer of claim 4, wherein said portable support frame comprises:

a square frame base;

a rectangularly shaped frame member perpendicular to first and second corners of said square frame base, respectively;

first and second angled frame members having one distal end thereof coupled to first and second corners, respectively, of said rectangularly shaped frame member;

first and second parallel short frame members have one distal end thereof coupled to first and second angled frame members, respectively;

first and second parallel long frame members having one distal end thereof coupled to first and second short parallel frame members, respectively, and the third and fourth corners, respectively, of square frame base; and, four wheels each of which is coupled in close proximity to a respective one of said first, second, third and fourth corners.

7. The portable, solar powered clothes dryer of claim 4, further comprising a solar power source coupled to one side of said portable support frame and a motor system coupled to the other side of said portable support frame wherein said portable support frame provides a channel for receiving therein wires for transferring the power from said solar power source to said motor system wherein said wires are protected from the environment in said channel.

8. The portable, solar powered clothes dryer of claim 4, wherein said dark-colored portable hamper is spherically shaped.

9. The portable, solar powered clothes dryer of claim 4, wherein said dark-colored portable hamper comprises:

a first hollow semi-spherical housing member having an access aperture formed therein;

a second hollow semi-spherical housing member coupled to said first hollow semi-spherical housing member wherein said first hollow semi-spherical housing member and said second hollow semi-spherical housing member form a spherically shaped housing;

an access door coupled to said first hollow semi-spherical housing member for enclosing said spherically shaped housing; and, at least one tumbler rib coupled to an interior surface of said spherically shaped housing.

10. A portable, solar powered clothes dryer comprising:

a portable support frame;

a spherically shaped dark-colored portable hamper, removably coupled to said portable support frame, having a plurality of perforations formed therein;

a hamper shaft journaled through a center of said dark colored portable hamper wherein said hamper shaft serves the dual functionality of (1) handles for facilitating the portability of said dark-colored portable hamper, and (2) a spinning axis for spinning said dark-colored portable hamper; and, a solar powered motor system coupled to one distal end of said hamper shaft for spinning said hamper shaft wherein as said hamper shaft spins said dark-colored portable hamper spins.

\* \* \* \* \*